Nov. 10, 1931.  G. W. PAULSON  1,831,134
STEERING GEAR FOR AIRSHIPS
Filed Aug. 20, 1930  3 Sheets-Sheet 1
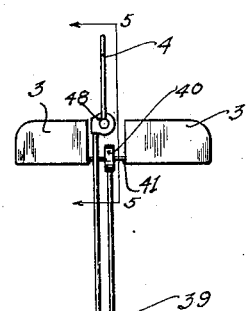
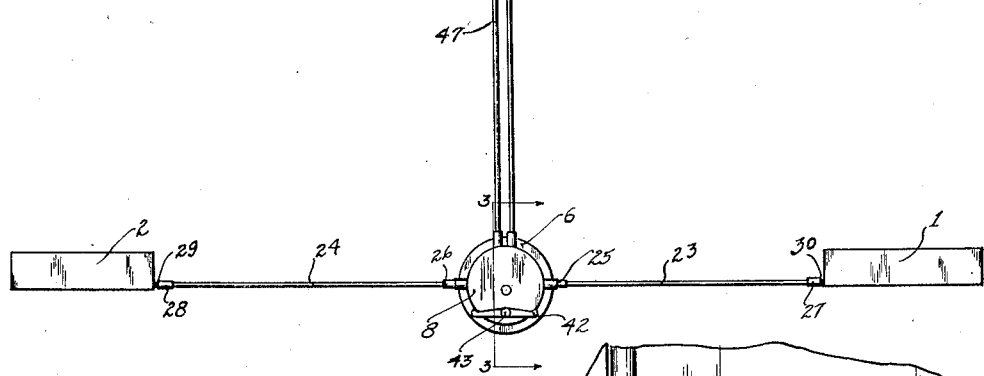
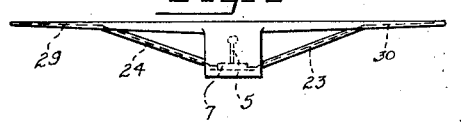
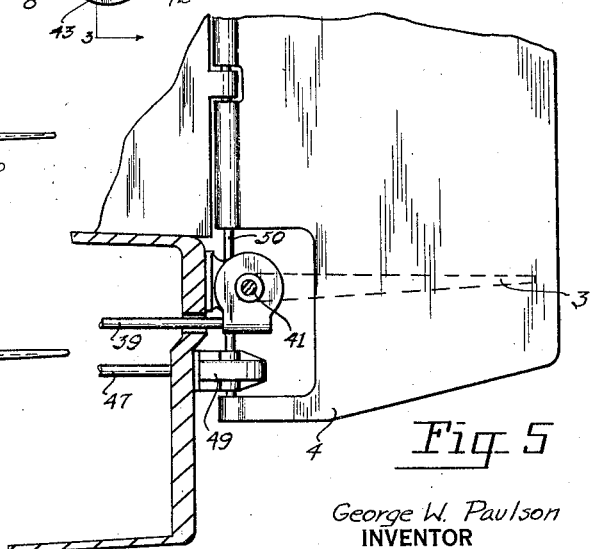
George W. Paulson
INVENTOR
ATTORNEY

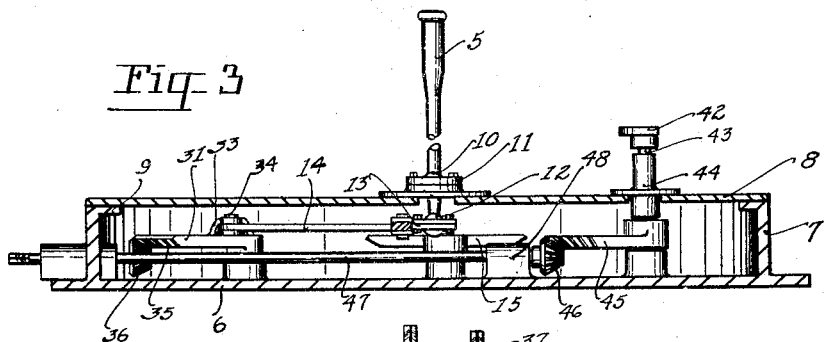

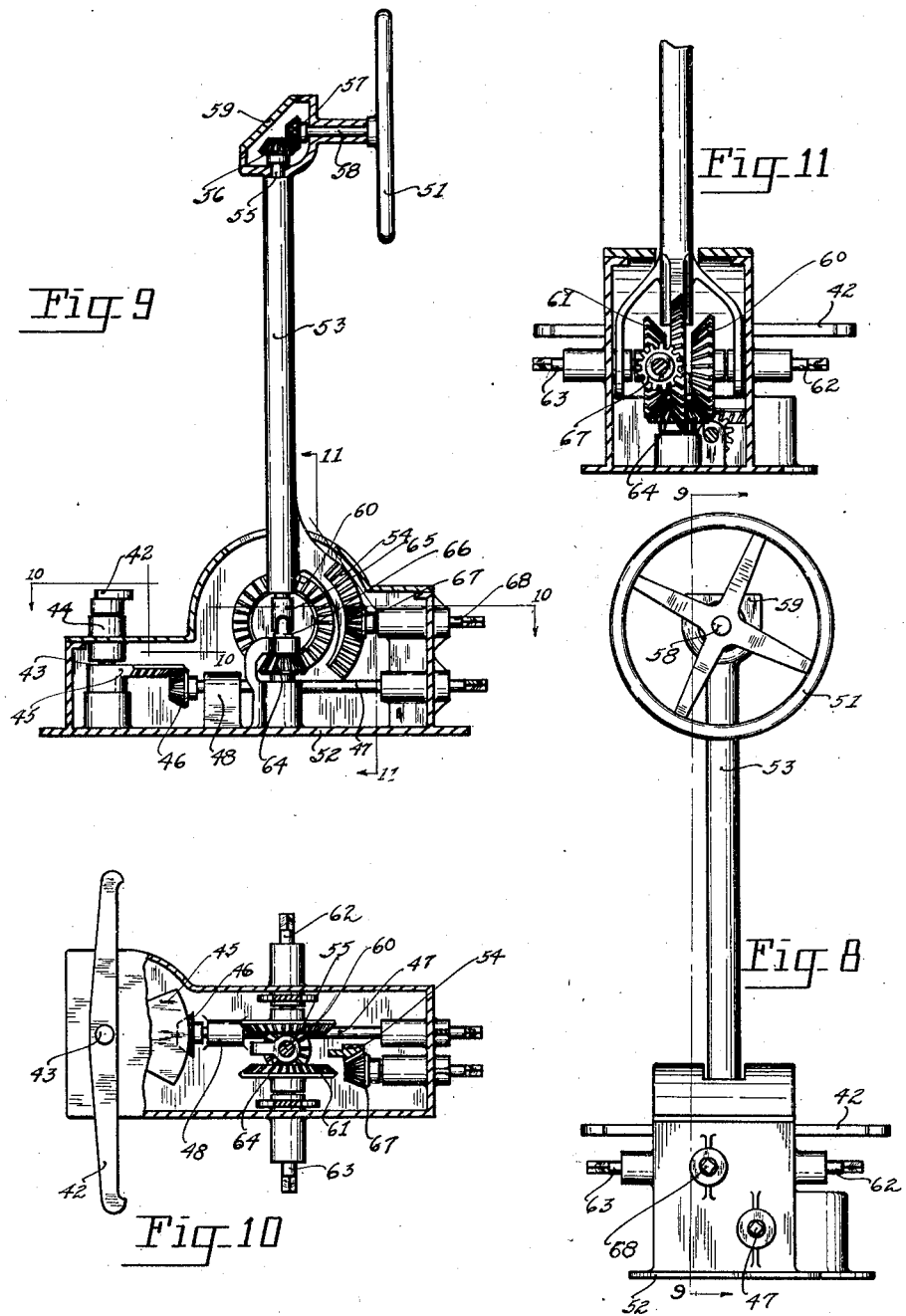

Patented Nov. 10, 1931

1,831,134

UNITED STATES PATENT OFFICE

GEORGE W. PAULSON, OF PORTLAND, OREGON, ASSIGNOR, BY DIRECT AND MESNE ASSIGNMENTS, TO STEERING GEAR MANUFACTURING CO., OF PORTLAND, OREGON, A CORPORATION OF OREGON

STEERING GEAR FOR AIRSHIPS

Application filed August 20, 1930. Serial No. 476,655.

My valued invention is intended for use for application upon airplanes, airships, and the like and has for its purpose and object, the successful handling of the ship while in flight and for landing the same at the end of the flight.

Heretofore in devices of this kind it has been the general practice to have the control stick, or wheel, so arranged and so placed that the movement of the same, through the use of connecting lines, as wires, will regulate and control the ailerons, the movable flap and the vertical rudder simultaneously. This form of construction is fragile and easily becomes inoperative.

In my new and improved construction, I utilize hollow tubing, universal joints, and associated gearing elements to accomplish the result through approved construction and the utilization of elements that are positive in their action, durable in their life and that may be operated over relatively long operating periods with freedom from mechanical annoyances.

A further advantage and object of my new and improved construction resides in a construction that affords greater safety to the ship, and its occupants, than the construction heretofore used.

A further object of my invention consists in providing a construction through the operation of which positive and accurate movement may be imparted to the controls for regulating the movement of flight of the ship and that will have a minimum of lost motion embodied within the construction.

A still further object of my invention consists in placing in the hands of the operator of airships a construction that is rugged in its construction and that may be used with greater safety than those heretofore used.

With these and incidental objects in view, the invention consists in certain novel features of construction and combination of parts, the essential elements of which are set forth in the appended claims, and a preferred form of embodiment of which is hereinafter shown with reference to the drawings which accompany and form a part of this specification.

In the drawings:

Fig. 1 is a top, plan view of the assembled associated elements, shown as being connected with the ailerons, the movable flap and the vertical rudder with the elements, as shown as being manipulated from a common point.

Fig. 2 is an end view of the mechanism illustrated in Fig. 1.

Fig. 3 is a fragmentary, sectional, side view of the mechanism illustrated in Figs. 1 and 2, the same being taken on line 3—3 of Fig. 1, looking in the direction indicated.

Fig. 4 is a fragmentary, sectional, top plan view of the mechanism illustrated in Fig. 3, the same being taken on line 4—4 of Fig. 2 looking in the direction indicated.

Fig. 5 is a fragmentary, sectional, side view of the tail construction of the ship, the same being taken on line 5—5 of Fig. 1 looking in the direction indicated.

Fig. 6 is a diagrammatical layout of a monoplane of the older approved type, illustrating my new and improved construction embodied within the wing and strut structure of the same.

Fig. 7 is a diagrammatical, end view of the later construction illustrating my new and improved construction embodied therein.

Fig. 8 is an end view of a unit embodying my new and improved construction wherein a steering wheel is employed for the manipulation of the same.

Fig. 9 is a sectional, side view of the mechanism illustrated in Fig. 8, the same being taken on line 9—9 of Fig. 8, looking in the direction indicated.

Fig. 10 is a fragmentary, sectional, top plan view of the mechanism illustrated in Fig. 9, the same being taken on line 10—10 of Fig. 9 looking in the direction indicated.

Fig. 11 is a fragmentary, sectional, side view of the mechanism illustrated in Fig. 9, the same being taken on line 11—11 of Fig. 9, looking in the direction indicated.

Like reference characters refer to like parts throughout the several views.

Referring to Fig. 1, 1 is the left aileron; 2 is the right aileron; 3 is the movable flap; and 4 is the vertical rudder. The joy stick is shown at 5. I provide a base 6 having an annular upturned ring 7 disposed thereupon. A cover plate 8 is removably secured to the flange 9 of the annular ring. The same is secured thereto by any suitable fastening means. A spherical ball 10 is disposed upon the joy stick that is adapted to operate within the housing 11 disposed central of the cover plate 8. A second spherical ball 12 terminates the lower end of the joy stick, the same being adapted for placement within a housing 13. The housing 13 is mounted upon a full floating central control bar 14.

Aileron gear control segments 15 and 16 are rockably disposed about the journals 17 and 18. A gear segment is disposed upon the outer, upper rim surface of the gear segment. Bevel pinions 19 and 20 are adapted for coacting with the gear segments. The bevel pinions are mounted respectively upon the stub shafts 21 and 22. The stub shafts are journaled within suitable bearings that are formed integral with the annular ring 7 to bring the bevel pinions in registerable engagement with the gear segments, with which the same are adapted to coact. Shafts 23 and 24 are adapted for coacting with the stub shafts 21 and 22 and where the ailerons 1 and 2 are out of alignment with the longitudinal center line of the stub shafts 21 and 22, universal joints 25 and 26 may be interposed between the tubular shafts 23 and 24 and the stub shafts 21 and 22. It may, also, be necessary to place universal joints 27 and 28 between the tubular shafts 23 and 24 and the shafts 29 and 30 upon which the ailerons 1 and 2 are respectively mounted.

A gear segment 31 is rockably disposed about the journal pin 32. An arm 33 is disposed at one side of the journal pin 32 and is preferably formed integral with the gear segment 31 and a journal pin 34 connects the free end of the arm 14 with the journal pin 34. A bevel gear segment 35 is formed upon one side of the outer rim of the gear segment 31.

A bevel pinion 36 is adapted for coacting with the bevel gear segment 35, the bevel pinion being secured to the stub shaft 37. The stub shaft 37 is journaled within the annular ring 7 that upwardly extends from the base 6. The stub shaft 37 is journaled within a suitable journal bar 38. A tubular shaft 39 rearwardly extends from the stub shaft 37. A gear 40 is mounted upon a shaft 41 to which the movable flaps are secured and a pinion is mounted upon the tubular shaft 39 and is adapted for coacting with the gear 40 mounted upon the shaft 41.

The pilot of the ship is so stationed that his feet are placed upon the foot control lever 42. The lever being fixedly positioned upon the stub shaft 43. The stub shaft is journaled within a bearing 44 that is removably secured to the cover plate 8. A gear segment 45 is disposed upon the lower end of the stub shaft 43 and as the foot lever 42 is moved to partially rotate the stub shaft 43, the gear segment 45 is also moved. A bevel gear 46 is adapted for coacting with the gear segment 45 and as the gear segment is partially rotated, the bevel gear 46 coacting therewith is also actuated. The bevel pinion 46 is positioned upon a tubular shaft 47. The shaft 47 is journaled, upon its one end, in a journal bearing 48 that is disposed upon the base 6. The tubular shaft 47 rearwardly extends from the base 6 and has a pinion 48 disposed upon the rear end thereof that coacts with a gear 49 mounted upon the shaft 50 to which the vertical rudder 4 is secured and as the shaft 47 is partially rotated, the vertical rudder will also be moved accordingly. One or more universal joints may be placed upon the shaft 47 to compensate for any difference in alignment that may exist between the base 6 and the vertical rudder.

Where my new and improved construction is to be adapted for manipulation by a steering wheel 51, the same may be made as illustrated in Figs. 8, 9, 10 and 11 in which a base 52 is used for the mounting of the assembly unit with a standard 53 upwardly extending therefrom, the standard having a gear segment 54 disposed at its base. The steering column 53 is tubular and through which a shaft 55 longitudinally extends. A bevel gear 56 is disposed upon its upper end adapted for coacting with a bevel gear 57. The bevel gear 57 is mounted on the steering wheel shaft 58 and the steering wheel 51 is secured thereto. Suitable bearings are disposed within the head 59 for journaling the shafts 55 and 58. The gear 64 is adapted for having bevel gears 60 and 61 coacting therewith and to be rotated as the gear 64 is rotated as the steering wheel is rotated by the pilot. As the gears 60 and 61 are rotated, stub shafts 62 and 63, to which the gears are fastened, are also partially rotated since the bevel gears 60 and 61 are secured thereto. The stub shafts 62 and 63 have the tubular shafts 23 and 24 positioned thereupon for imparting movement to the ailerons 1 and 2. The imparting of a forward and backward movement to the steering column 53 upon which the steering wheel is mounted partially rotates the gear segment 54. A bevel pinion 67 is so placed as to coact with the gear segment 54, and as the rocking motion is imparted to the steering column and to the gear segment the bevel pinion 67 is also rotated. The pinion 67 is secured to the stub shaft 68. Tubular shaft 39 is secured to the stub shaft 68.

A universal joint 65 is disposed between the shaft 55 and the stub shaft 66 to which the bevel gear 64 is attached. For some construction, or adaptations, it may be possible to make the shaft 55 and the shaft 66 in one piece without the placing of the universal 65 thereupon.

While the form of mechanism herein shown and described is admirably adapted to fulfill the objects primarily stated, it is to be understood that it is not intended to confine the invention to the one form of embodiment herein shown and described, as it is susceptible of embodiment in various forms, all coming within the scope of the claims which follow.

What I claim is:

1. In a device of the class described, the combination of a base, an annular upturned ring disposed upwardly from the base, a cover plate for the base, a split bearing disposed central of the base having a joy stick journaled within the split bearing, a full floating control bar depending from the lower end of the joy stick and secured thereto by a ball bearing, a plurality of gear control segments journaled about vertical stub shafts secured to the base, links connecting the floating control bar with the gear segments, pinions mounted upon shafts journaled within the upwardly extending ring secured to the base, said pinions being adapted for coacting with the gear segments and for being rotated thereby, means for connecting the said stub shafts with aileron controls, a second gear segment coacting with the gear adapted for being actuated by the full floating central control bar, the shaft upon which the pinion is mounted being adapted for controlling a tubular shaft leading to the movable flaps, and a fourth gear segment journaled about a vertical shaft upwardly extending from the base having a pinion coacting therewith that is adapted for controlling the vertical rudder.

2. In a device of the class described, the combination of a base having an annular ring upwardly extending therefrom, a cover plate for the base, an annular ring, a joy stick journaled relative to the closure plate having a full floating central control bar secured by a ball bearing connection to the lower, inner end of the joy stick, gear segments and pinions associated with the full floating control bar for rotating the shafts for controlling the ailerons and the movable flaps, a vertical shaft and a journal bearing disposed in the forward end of the base having a foot control lever secured to the upper end of the shaft, a gear segment secured to the shaft, to which the foot control lever is secured, a pinion coacting with the gear segment, and a control shaft and gear disposed between the vertical rudder and the foot control lever adapted for imparting movement to the vertical rudder, as the control lever is manipulated.

3. In a device of the class described, the combination of a base, a split bearing disposed centrally of the base, a joy stick journaled within the split bearing, a control bar journaled to the lower end of the joy stick, a plurality of stub shafts upwardly extending from the base, control means disposed upon each of the stub shafts, means for connecting the control bar to each of the control means, a plurality of shafts rotatably disposed outwardly from the base, coacting elements secured to the shafts and adapted to coact with the control means disposed upon the stub shafts, means for connecting the shafts to the various controls, and means for actuating the control means.

GEORGE W. PAULSON.